United States Patent [19]
Henning et al.

[11] Patent Number: 5,429,408
[45] Date of Patent: Jul. 4, 1995

[54] WATERPROOF RETRACTABLE TARP COVER SYSTEM FOR CONTAINERS

[75] Inventors: Steven A. Henning, Anderson; Michael J. Morrow, Indianapolis, both of Ind.

[73] Assignee: Aero Industries, Inc., Indianapolis, Ind.

[21] Appl. No.: 162,311

[22] Filed: Dec. 6, 1993

[51] Int. Cl.⁶ ............................................. B60P 7/04
[52] U.S. Cl. ................................. 296/100; 296/105
[58] Field of Search ................... 296/100, 104, 105; 160/84.1 A

[56] References Cited

U.S. PATENT DOCUMENTS

| | | | |
|---|---|---|---|
| 1,827,059 | 10/1931 | Woolcott | 296/105 |
| 2,406,737 | 9/1946 | Bramble | 296/105 |
| 2,469,958 | 5/1949 | Fowler | 296/105 |
| 3,298,732 | 1/1967 | Openshaw | 296/100 |
| 4,189,178 | 2/1980 | Cramero | 296/105 |
| 4,215,897 | 8/1980 | Aiken | 296/100 |
| 4,289,346 | 9/1981 | Bourgeois | 296/105 |
| 4,711,484 | 12/1987 | Tuerk | 296/105 |
| 4,725,090 | 2/1988 | Weaver | 296/100 |
| 4,801,171 | 1/1989 | Weaver | 296/100 |
| 4,858,984 | 8/1989 | Weaver | 296/100 |
| 4,948,193 | 8/1990 | Weaver | 296/100 |
| 4,995,663 | 2/1991 | Weaver | 296/100 |
| 5,067,767 | 11/1991 | Biancale | 296/100 |
| 5,102,182 | 4/1992 | Haddad, Jr. | 296/100 |
| 5,174,625 | 12/1992 | Gothier et al. | 296/98 |

FOREIGN PATENT DOCUMENTS

| | | | |
|---|---|---|---|
| 379821 | 8/1990 | European Pat. Off. | 296/100 |
| 32135 | 9/1927 | France | 296/105 |
| 1238055 | 6/1960 | France | 296/100 |
| 2646817 | 11/1990 | France | 296/100 |
| 887459 | 9/1953 | Germany | 296/105 |
| 290034 | 5/1928 | United Kingdom | 296/105 |

OTHER PUBLICATIONS

"ESTES Presentes The New Generation of Sliding Roof Systems", European Transport Systems Brochure (Undated).

Primary Examiner—Dennis H. Pedder
Attorney, Agent, or Firm—Laubscher & Laubscher

[57] ABSTRACT

A tarp cover system includes a plurality of bows that extend transversely across an open-topped vehicle-mounted container for supporting a tarp cover, characterized in that the drive system for driving the bows between container-covered and container-uncovered conditions includes at each side of the container an endless cable arrangement including a pair of parallel horizontally-spaced runs that are contained in a common horizontal plane and are arranged on opposite sides of a longitudinally extending support upon which the bows are slidably mounted. Protective flanges extend laterally from the support above the cable runs, thereby to protect the cable runs during loading and unloading of the container. The side edges of the tarp extend horizontally outwardly over the cable runs and downwardly adjacent the external sides of the container, thereby to waterproof and protect the upper side edges of the covered container against the entry of water and dirt.

19 Claims, 7 Drawing Sheets

WATERPROOF RETRACTABLE TARP COVER SYSTEM FOR CONTAINERS

STATEMENT OF THE INVENTION

An improved tarp cover system for open-topped vehicle-mounted containers is disclosed in which the drive system for driving the tarp-supporting transverse bows includes endless cable means having at each side of the conveyor a pair of parallel horizontally-spaced longitudinally-extending runs that are contained in a common horizontal plane and are arranged on opposite sides of a longitudinal support upon which the ends of the bows are slidably supported.

BRIEF DESCRIPTION OF THE PRIOR ART

It is well known in the prior art to provide tarp cover systems having transversely extending bows that support a tarp cover and that are driven by endless conveyor means between container-covered and container-uncovered conditions. Examples of such known systems are presented in the prior patents to Cramaro U.S. Pat. No. 4,189,178, Fowler U.S. Pat. No. 2,469,958, Weaver U.S. Pat. No. 4,725,090, and Aiken et al U.S. Pat. No. 4,215,897. In order to improve the waterproofing and sealing of the upper portions of the side walls of the container, it has been proposed to extend the cover laterally outwardly and downwardly adjacent the external surfaces of the container side walls, as taught by the patents to Openshaw U.S. Pat. No. 3,298,732, Bramble U.S. Pat. No. 2,406,737, Woolcott U.S. Pat. No. 1,827,059 and Tuerk U.S. Pat. No. 4,711,484.

In these known systems, it is customary to drive the tarp-supporting transverse bows by reversibly-driven endless cable means having at each side of the container a pair of vertically-spaced longitudinally-extending runs, the upper run serving to drive the bows between container-covered and container uncovered conditions. The upper cable runs are simultaneously driven in the same direction by a common horizontal drive shaft that extends transversely at one end of the container, which shaft is normally manually driven by hand crank means via a sprocket and chain drive connection. The ends of the transversely-extending bows are generally slidably supported by the upper edges of the side walls of the container.

These known systems are rather difficult, time consuming and costly to accurately install on an existing vehicle container. Furthermore, the bow drive chains or cables are often mounted in an exposed condition externally of the container and are thus subject to damage during loading and unloading of the container. In the case where the cover-supporting bows are mounted for sliding movement on the top edges of the container side walls, it is difficult to protect during transport the gaps between the side edges of the tarp and the upper side edges of the covered container against leakage and the infiltration of dirt and other impurities. Finally, maintenance and repair of the known tarp systems have proven to be difficult and expensive.

Thus, the present invention was developed to provide an improved tarp cover system that avoids the above and other drawbacks of the prior art systems.

SUMMARY OF THE INVENTION

Accordingly, a primary object of the present invention is to provide an improved tarp cover system for vehicle-mounted open-topped containers including longitudinal support means secured to the upper edges of the container side walls for supporting the ends of the transverse cover-supporting bows for sliding movement longitudinally of the container, and drive means for reversibly driving the bows between container-covered and container-uncovered conditions, said drive means including endless cable means having first horizontal drive runs adjacent and laterally spaced from the remote external surfaces of the support, the ends of the bows being slidably connected with and guided by said first drive runs. Protective flange means carried by the longitudinal support means extend laterally outwardly above the first drive runs.

According to another object of the invention, the drive means include a pair of endless cables extending longitudinally of the container side walls, respectively, said endless cables having return second runs adjacent the internal surfaces of the support means and each being arranged in the same horizontal plane as the associated first run, protective flange means also extending laterally inwardly from the support means above said second conveyor run. The first and second runs are guided at opposite ends by pulleys having vertical axes of rotation, and are driven by drive pulleys having a horizontal axis of rotation, said drive pulleys being mounted on a horizontal drive shaft that extends transversely adjacent one end of the container. Hand crank means are provided for rotating the drive shaft alternately in opposite directions, thereby to drive the bows to cover and uncover the container respectively.

According to another object, the side edges of the tarp cover extend outwardly over the bow support means and downwardly adjacent the external upper portions of the side wall, thereby to seal the upper side edges of the container against the entry of water and dirt. Hold-down means are provided for holding down the free side edges of the tarp cover.

According to another object of the invention, the tarp cover system includes longitudinal support means that are mounted on the top edges of the container side walls, and front and rear bulkheads that are mounted on the top edges of the container end walls, respectively, thereby simplifying the installation of the system. The transverse drive shaft is rotatably supported by one of the bulkheads (normally the front bulkhead) for driving the endless cables which slidably displace the bows longitudinally of the support means. Manually-operable crank means are mounted at an accessible location externally of the container for driving the transverse drive shaft to longitudinally displace the bows.

BRIEF DESCRIPTION OF THE DRAWINGS

Other objects and advantages of the invention will become apparent from a study of the following specification, when viewed in the light of the accompanying drawings, in which.

DETAILED DESCRIPTION

Figure 1:
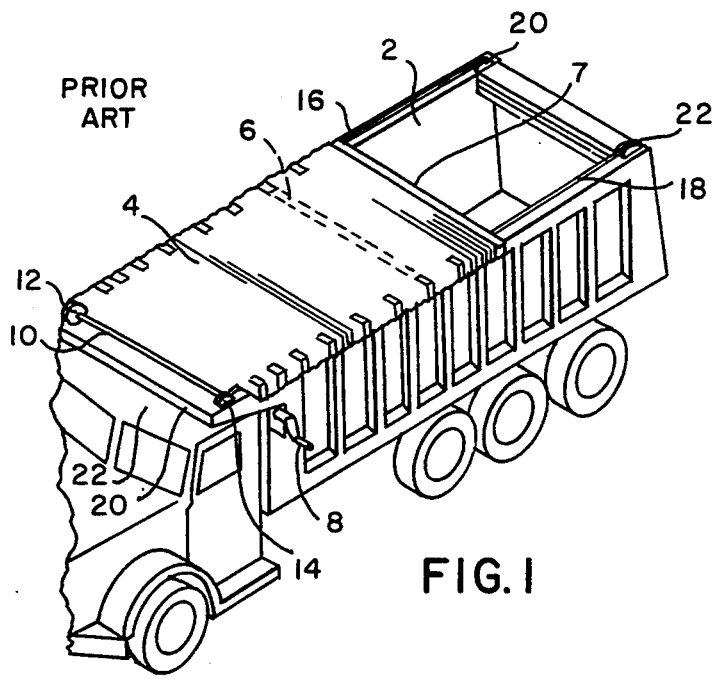
FIG. 1 is a perspective view of a vehicle tarp cover system of the prior art.
Figure 2:
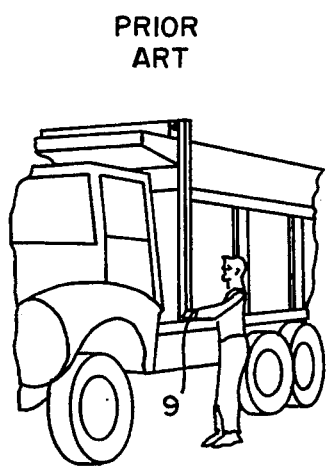
FIG. 2 illustrates a hand crank means for operating a tarp cover system of the prior art alternately between covered and uncovered conditions.

Referring first more particularly to FIG. 1 (which corresponds with the prior art tarp cover arrangement disclosed in the Weaver patent U.S. Pat. No. No. 4,725,090) the open-topped vehicle-mounted container body 2 is covered by a tarp cover member 4 that is carried by a plurality of bow members 6 that extend transversely across the container and are supported by the upper edges of the sidewalls of the container for longitudinal displacement relative to the container. The tarp cover is driven between container-covered and container-uncovered condition by a hand crank 8 that drives a transverse drive shaft 10 having at each end drive pulleys 12 and 14 upon which are mounted the drive cables 16 and 18, respectively. At the rear end of the vehicle container, the cables are supported by idler pulleys 20 and 22, respectively. The upper runs of the drive cables are connected with the rearmost bow 7, which bow constitutes a power bow for covering or uncovering the container in accordance with the direction of rotation of the hand crank 8. The return runs (not shown) of the cable 16 and 18 are parallel with and vertically spaced below the upper drive runs that are connected with the power bow 7. In the embodiment of FIG. 1, the hand crank 8 is located for operation by a vehicle operator standing on the adjacent running board, while in the modification of FIG. 2, the hand crank means 9 is arranged for operation by an operator standing at ground level.

Figure 3:
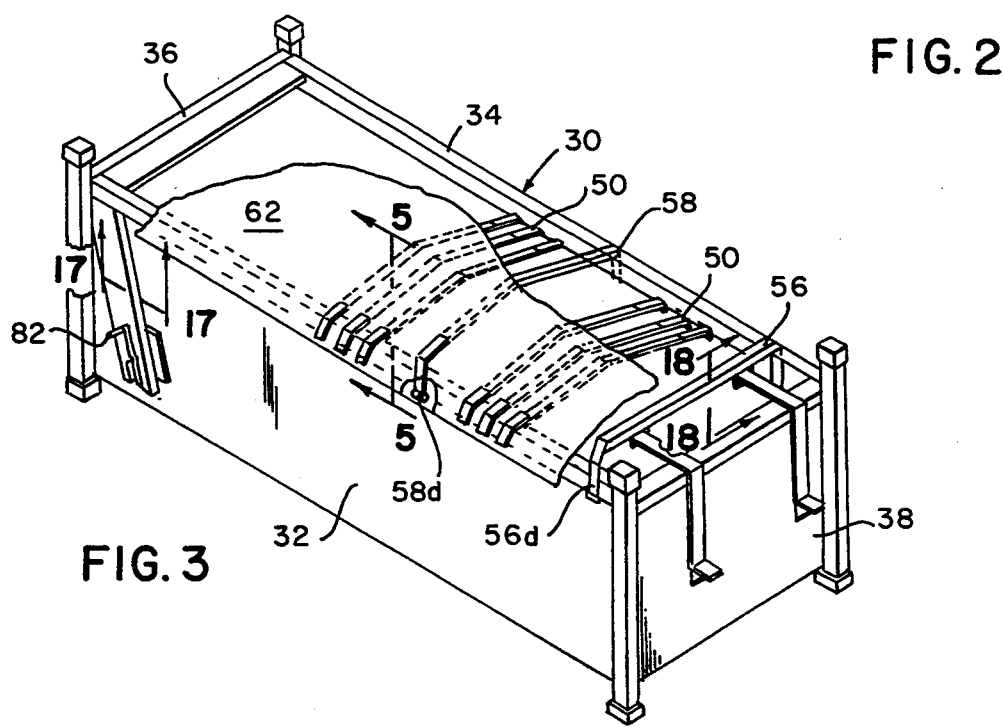
FIG. 3 is a perspective view of the improved tarp cover system of the present invention.
Figure 4:
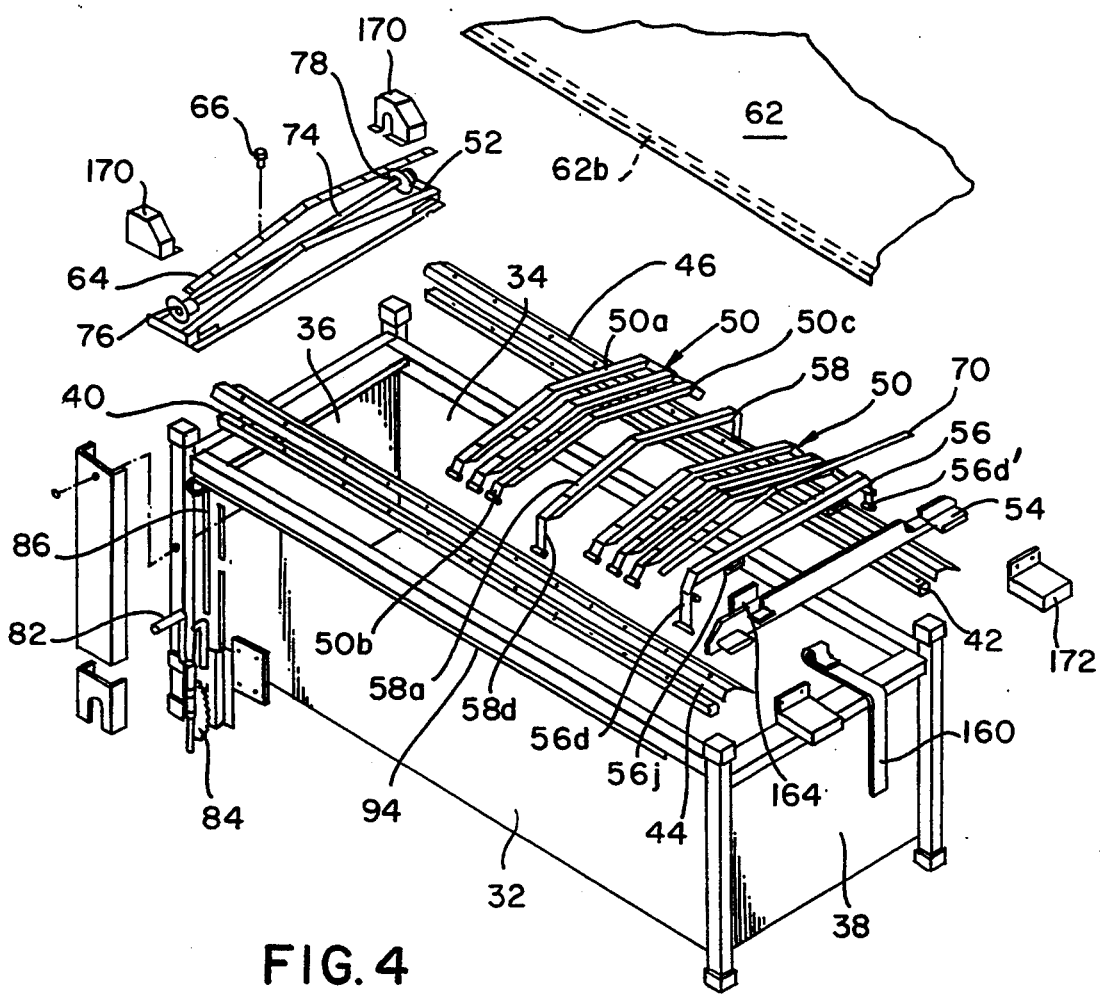
FIG. 4 is an exploded view of the tarp cover system of FIG. 3.
Figure 7:
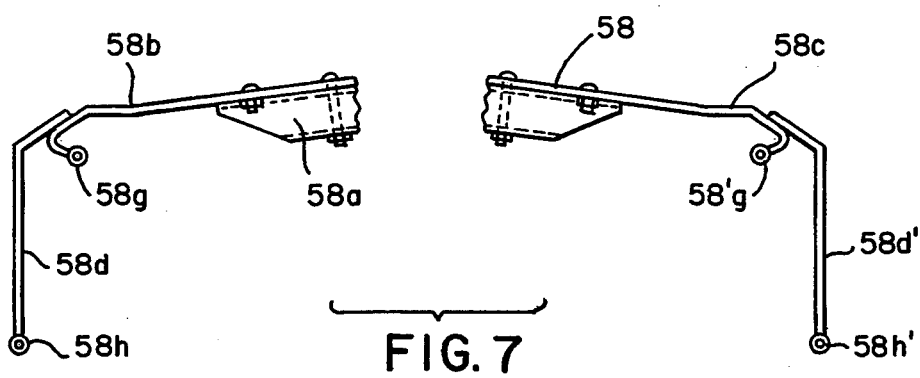
FIG. 7 is a front elevational view of an intermediate hold-down bow.
Figure 10:
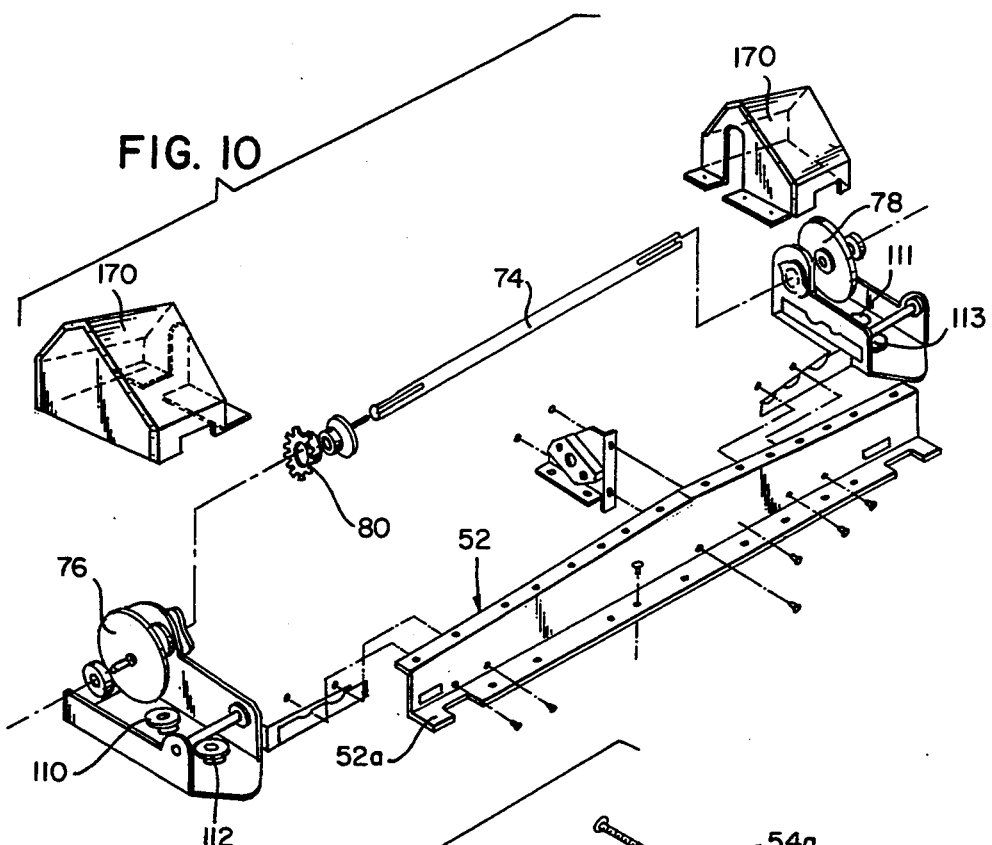
FIGS. 10 and 11 are exploded perspective views of the front and rear bulkheads of FIG. 4.
Figure 11:
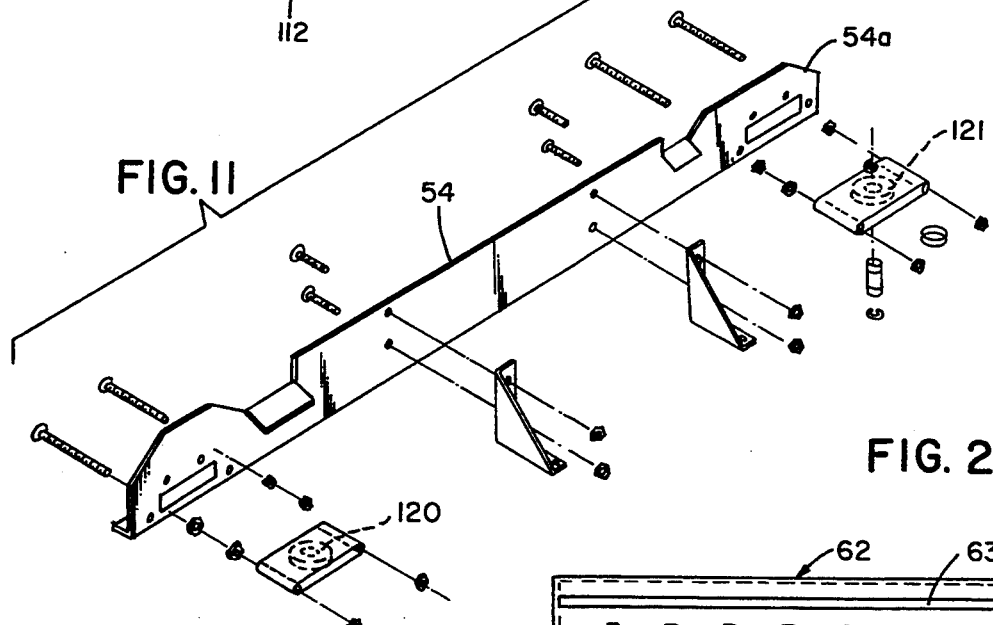
Figure 13:
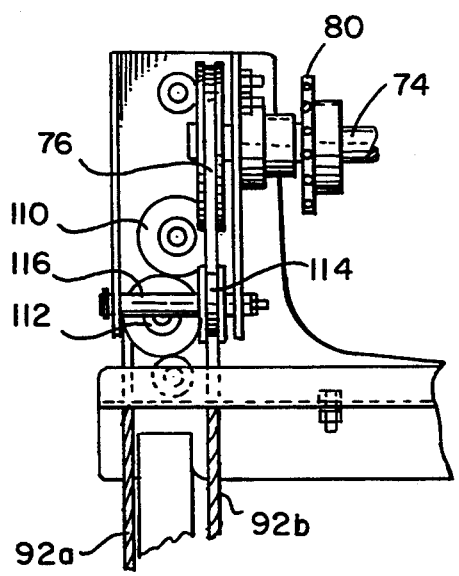

Referring now to the present invention as shown in FIGS. 3 and 4, the open-topped container 30, which is suitable for mounting on a motor-driven vehicle, a railroad flat bed car, or the like, includes a pair of longitudinally extending side walls 32 and 34, a front end wall 36, and a rear end wall 38. Mounted on the upper edges of these side walls 32 and 34 are a pair of longitudinally extending support bars 40 and 42 that support protective flange members 44 and 46, respectively. Slidably supported at their ends on the flange members 44 and 46 are a plurality of transversely-extending longitudinally displaceable bow members 50. Mounted upon the upper edges of the front and rear end walls 36 and 38 are forward and rear bulkhead means 52 and 54, respectively. A further rearmost bow 56 constitutes a power bow member of generally U-shaped configuration having at each end downwardly extending hold-down extensions 56d. Similarly, as shown in FIGS. 4 and 7, a central bow 58 may be provided also having downwardly-extending hold down extensions 58d. The bow members support a conventional tarp cover 62 the forward transverse hem 62c (FIG. 21) of which is secured to the front bulkhead 52 by securing strip 64 and screws 66. Similarly, the rear hem 62d of the tarp cover 62 is secured to the upper surface of the power bow 56 by securing strip 70 and a plurality of fastening screws (not shown). The front bulkhead 52 rotatably supports a drive shaft 74 upon the ends of which are secured a pair of drive pulleys 76 and 78. Intermediate its end, the drive shaft 74 is provided with a sprocket gear 80, as best shown in FIGS. 10 and 13. The drive shaft 74 is reversibly driven manually by conventional means including a hand crank 82, sprocket gear 84 and chain 86.

Figure 5A:
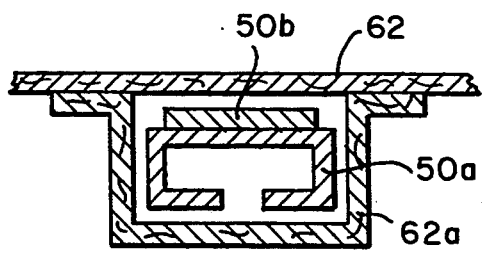
FIG. 5A is a sectional view taken along line 5A—5A of FIG. 5.
Figure 5:
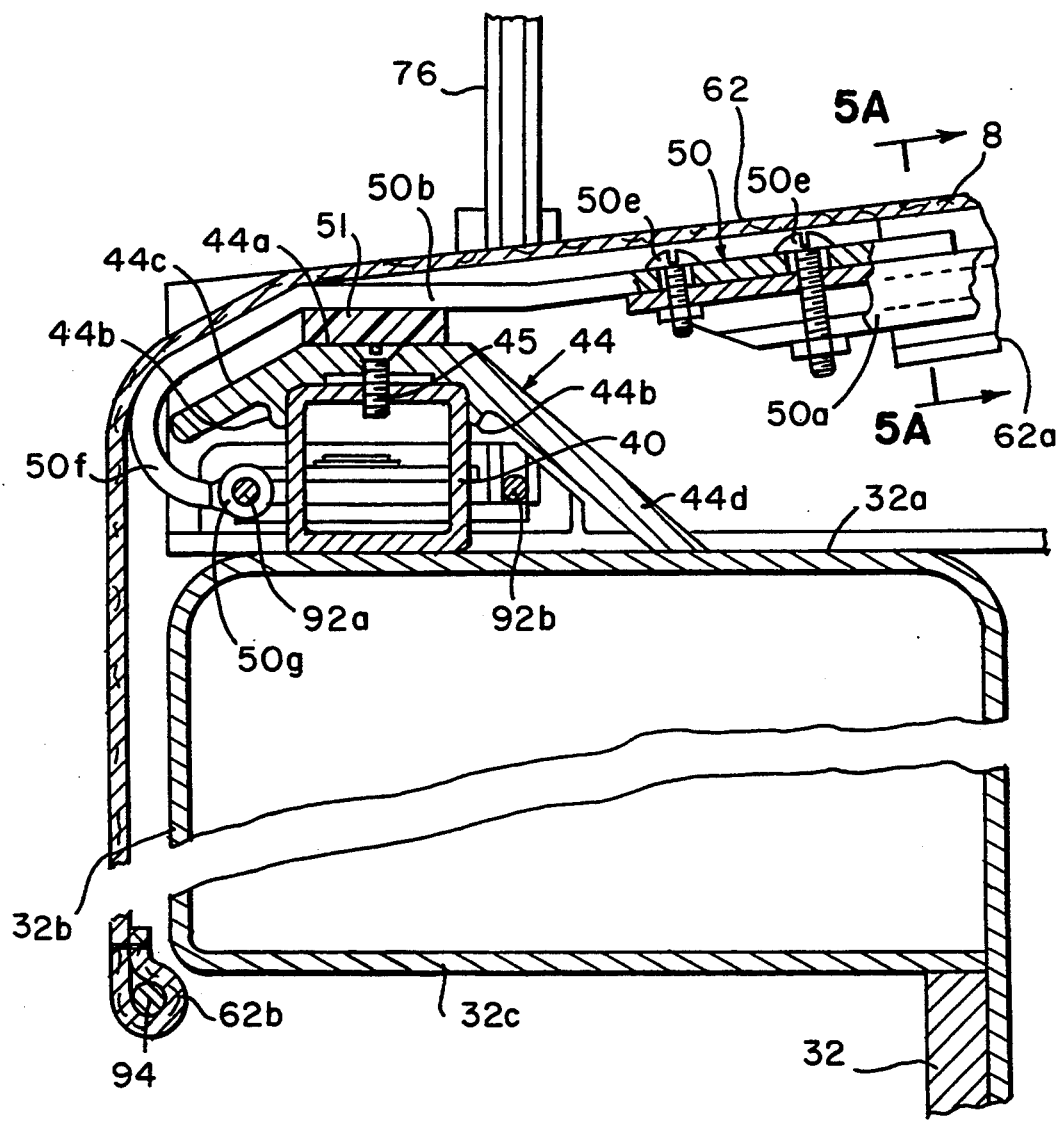
FIG. 5 is a sectional view taken along line 5—5 of FIG. 3.
Figure 6:
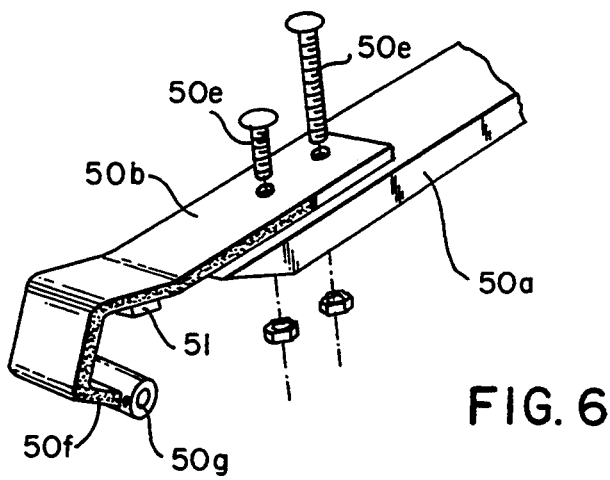
FIG. 6 is a perspective view of the bow end section of FIG. 5.

Referring now to FIG. 5, each of the bow members 50 is of sectional construction and includes a central section 50a that is contained within an associated transverse pocket 62a formed in cover 62, and to the ends of which are bolted by bolt means 50e a pair of end sections 50b and 50c, respectively.

The longitudinally-extending support bar 40 is rigidly secured (for example by welding) to the horizontal upper surface 32a of the upper edge portion 32b of the sidewall 32. The flange member 44 is removably connected with the upper portion of the support bar 40 by flat-head screws 45. The central portion of the flange member 44 is provided with a pair of laterally-spaced longitudinally-extending stabilizing ribs 44b between which the upper end of the bar 40 is received, thereby to prevent lateral displacement of the flange member 44 relative to the support bar 40. The flange member 44 is provided with laterally outwardly and laterally inwardly extending flange portions 44c and 44d, respectively, as will be explained in greater detail below.

Secured to the lower surface of the bow end section 50b is a slide pad 51 that is seated in sliding engagement with the upper slide surface 44a of the flange member 44. The slide pad 51 is formed from a material having a low coefficient of friction, as for example Teflon. Similar slide pads are provided at the other ends of the bows for engagement with flange member 46.

In accordance with a characterizing feature of the present invention, the bow end section 50b extends outwardly beyond, and downwardly and inwardly below, the flange portion 44c, the bow end section terminating in an inwardly bent end portion 50f that terminates in an integral tubular guide sleeve 50g. The bore contained in the tubular portion 50g slidably receives a first horizontal run 92a of a drive cable 92, as will be described below.

Figures 8, 8A, 9:
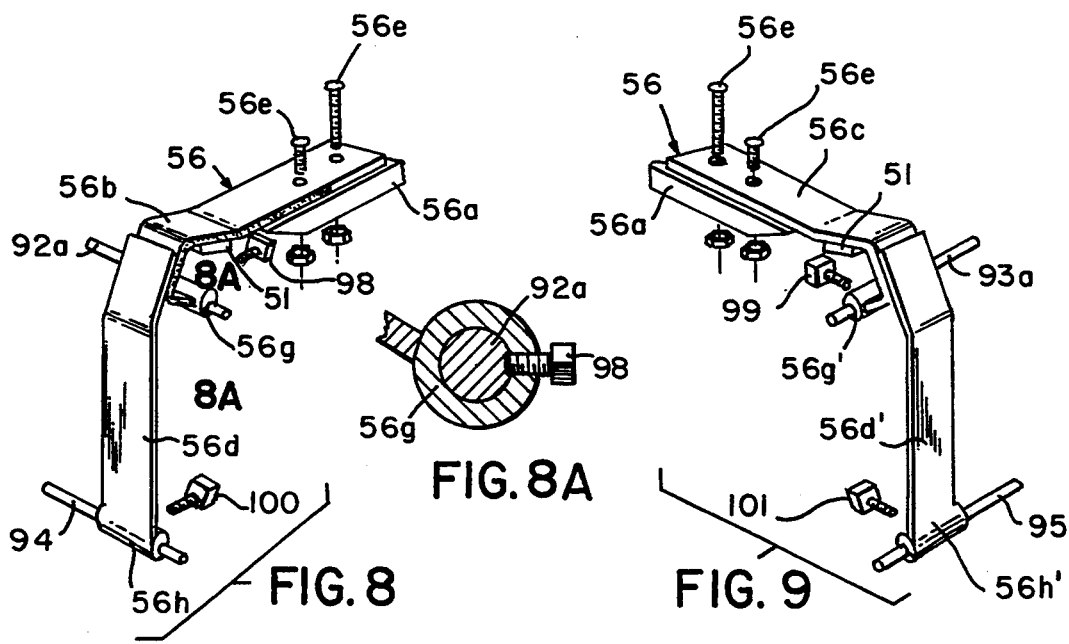
FIGS. 8 and 9 are detailed perspective views of the end sections of the power bow.
FIG. 8A is a sectional view taken along line 8A—8A of FIG. 8.

Referring now to FIGS. 4 and 7-9, the power bow 56 and the central bow 58 are provided with downwardly extending hold-down extensions 56d and 58d, respectively. As shown in FIGS. 8 and 9, these hold-down extensions extend downwardly beyond the sleeve portions 56g that receive the first cable runs of the associated endless cable means. At their lower extremities, the hold-down extensions include tubular sleeve portions 56h that receive a hold-down and pleating cable 94 that extends horizontally externally of the side walls of the container, as shown in FIGS. 4 and 5. At its forward end, the hold-down and pleating cable 94 is connected by means of screw 104 with the lower surface 32c of the outwardly extending sidewall projection 32b at the top of sidewall 32 (FIG. 5). The hold-down and pleating cable 94 extends through a corresponding pocket 62b defined in the side edge portion of the tarp cover 8, and through the bores of tubular portions 58h and 56h. The hold-down and pleating cables on both sides of the container serve not only to hold down the tarp side edges, but also, as will be discussed below, for an outward blousing or pleating of the tarp. This keeps the tarp from bunching together between the bows, and facilitates the collapsing of the bows. As shown in FIG. 8, set screw means 98 are provided for rigidly connecting the power bow 56 with the first cable run 92a of drive cable 92, and set screw 100 is provided for rigidly connecting the hold-down and pleating cable 94 with the power bow 56. Similarly, at the other side of the container, the tubular sleeve 56g' receives the first drive run 93a of the corresponding endless drive cable 93, and is secured in place by the set screw 99. At its lower end, the tubular portion 56h' receives the hold-down and pleating cable 95 (FIG. 9) that extends horizontally adjacent the other side of the container, which hold-down cable is secured to the power bar 56 by set screw 101.

Figure 14:
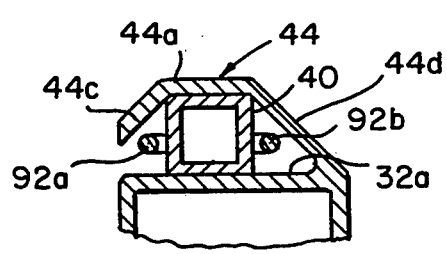
FIG. 14 is a sectional view of the intermediate portion of the endless drive cable of FIG. 12.
Figure 15:
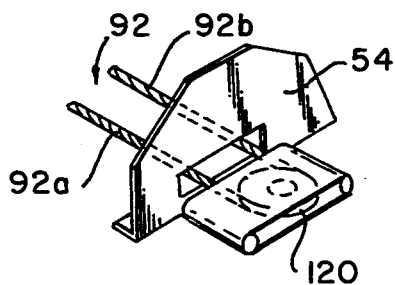
FIG. 15 is a perspective view of the idler end of the endless drive cable of FIG. 12.
Figure 16:
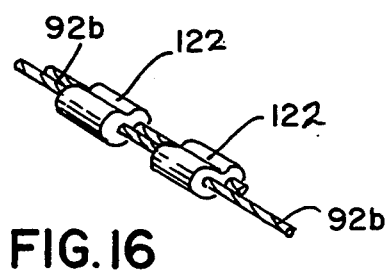
FIG. 16 is a detailed view of the drive cable splice means for splicing the drive cable of FIG. 12.

Referring now to FIGS. 12–16, the left-hand endless drive cable 92 is mounted on the drive pulley 76 and is converted to a first horizontal run 92a external of the support bar 40 by means of intermediate rollers 110 and 112 that are connected with the front bulkhead for rotation about vertical axes. The return run 92b is guided by guide roller 114 having a horizontal axis and that rotates about horizontal shaft 116. As shown in FIG. 14, the first drive run 92a extends on the external side of the support bar 40, and the return run 92b extends adjacent the internal side wall surface of longitudinal bar 40, both runs being arranged in protected relation beneath the lateral flange portions 44c and 44d of the flange member 44, respectively. At its rear end, cable 92 extends around the idler pulley 120 that is mounted on rear bulkhead 54 for rotation about a vertical axis. Thus, the first and second runs 92a and 92b of the left-hand cable 92 are horizontally spaced and are contained in a common horizontal plane and similarly, at the other side wall of the container, the endless drive cable 93 has drive and return runs that are horizontally spaced and contained in a common horizontal plane. As shown in FIG. 16, the return run 92b contains cable splices 120 as will be described in greater detail below. The cable 93 at the other side of the container contains similar splice means (not shown).

Figure 19:
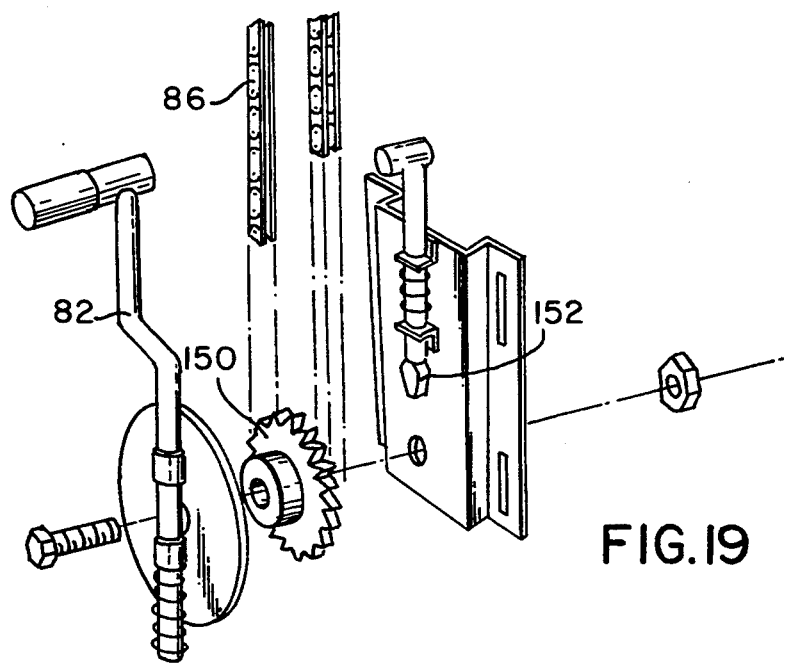
FIG. 19 is an exploded detailed perspective view of the band crank means of FIG. 3.

Referring now to FIG. 19, the hand crank 82 is rigidly connected with a sprocket gear 150 that is engaged by the spring-biased locking pawl 152 to lock the crankshaft in a given position. The hand crank 82 drives the drive shaft 74 via sprocket gear 150, sprocket chain 86, and the drive sprocket 80.

To assemble the tarp cover system on an existing open-topped vehicle-mounted container, the following steps are followed. The support bars 40 and 42 are mounted with their ends extending into corresponding cutouts contained in the front and rear bulkheads 52 and 54, whereupon the resulting rectangular assembly is seated on the top edges of the container 32. The front and rear bulkhead assemblies are then secured to the associated container end walls (for example, by self-tapping screws). The support bars 40 and 42 are then secured (for example, by welding) to the upper edge surfaces of the sidewalls 32 and 34, respectively, whereupon the flange members 44 and 46 are mounted upon the support bars 40 and 42, by flat head screws 45, as shown in FIG. 5. The power bow 56 is now mounted on the side rail flanges 44 and 46, whereupon the cable run 92a is strung rearwardly from the front bulkhead 52 through the bores contained in tubular portions 50g of the intermediate bows 50, through the corresponding bore contained in the center bow 58, through the remaining three intermediate bows 50, and through the tubular portion 56g of the power bow 56. The first cable run 92a is then fed around the idler pulley 120, and the return run 92b is fed through the opening in the rear bulkhead 54 (as shown in FIG. 15), and forwardly to a point about six inches from the front bulkhead 52. During this rearward and forward feeding of the cable 92, the runs 92a and 92b are on opposite sides of the center support 40, as shown in FIG. 14. At its forward end, the cable run 92a is fed around the pulleys 112 and 110, around the drive pulley 76 and the guide pulley 114, and then back through the opening in the front bulkhead 52, whereupon the ends are spliced together by the crimping connectors 122 shown in FIG. 16. Excess cable is then removed, whereupon the ends are taped with electrical tape to prevent unraveling.

Similarly, at the other side of the container, the corresponding endless cable 93 is fed through the corresponding tubular portions 50g of the intermediate bows, through the center bow 58, through the remaining bows 50, and through the power bow 56, whereupon the cable is fed outwardly through the opening in bulkhead 54a, around the idler pulley 121, and forwardly through the bulkhead opening whereupon the ends of the cable are spliced together as described above.

During this initial stringing of the cables, it is assumed that the end sections 50b and 50c of the bow members are disconnected from the center portions 50a. If this should not be the case, the center sections 50a are now unbolted from the end sections 50b and 50c. The power bow 56 is now displaced toward the rear bulkhead 54, with the cable splices 120 of the cables 92 and 93 being adjacent the front bulkhead. The set screws 98 and 99 are now tightened to secure the power bow to the cables 92 and 93, and the rear idler pulleys are adjusted to cause the drive cables 92 and 93 to be taunt. The crank assembly is now mounted on the sidewall 32, and the sprocket chain 86 is fed around the drive sprocket 80 on the drive shaft 74 and back downwardly around the sprocket (not shown) driven by the hand crank 82. The chain ends are then connected by a master link, and the crank assembly is pressed downwardly until the chain is taunt, whereupon the hand crank assembly is firmly bolted in place.

The tarp 62 is now laid upside down on a flat surface with the transverse pockets 62a facing up, whereupon the center bow sections 50a and 58a are introduced into both their associated pockets and inserted until they project at both ends therefrom. The tarp and bow assembly is now inverted and lifted onto the top of the container, whereupon the ends of the bow center sections 50a and 58a are bolted to the end sections 50b and 50c and 58b and 58c, as shown in FIG. 5.

The rear end of the tarp 62 is then connected with the power bow 56 by means of self-tapping screws and the mounting strip 70. The power bow 56 is then cranked by hand crank 82 to the rear leaving about one inch space between the rear of the bow and the rear bulkhead 54. The lock pawl 152 is then engaged with the ratchet 150, and the front edge of the tarp is connected with the front bulkhead 52 by means of the mounting strip 64 and self-tapping screws 66.

Figure 17:
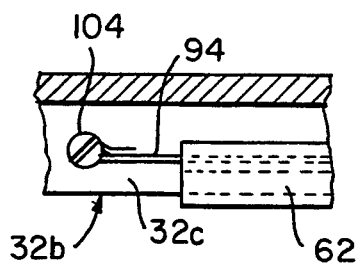
FIGS. 17 and 18 are detailed sectional views taken along lines 17—17 and 18—18 of FIG. 3.

In order to install the hold-down and pleating cable 94, a slit is made in the cover pocket 62b adjacent the center bow 58, whereupon one end of hold-down cable 94 is inserted through the pocket 62b, through bushing 58h at the lower extremity of the center bow 58, through the remaining portion of the pocket 62b and through the bore contained in bushing 56h at the lower end of the power bow 56. Set screw 100 is then tightened to rigidly secure the power bow to the hold-down and pleating cable 94, and the forward end of the cable 94 is connected with the bottom surface 32c by screw 104, as shown in FIG. 17.

Figure 18:
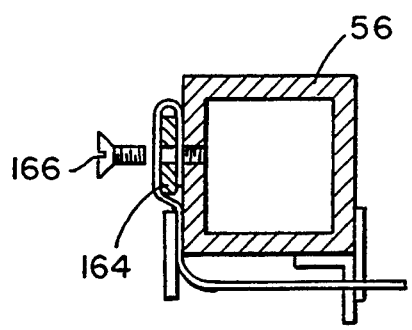

The hand crank 82 is then operated to displace the power bow 56 slightly forwardly, whereupon the tensioning straps 160 at the rear of the container are guided through the strap guides 56j on the power bow 56, and are secured to the front side of the power bow by the bracket 164 and screw 166, as shown in FIG. 18. The tensioning strap 160 is now tightened against the rear bulkhead by ratchet means (not shown), and the guide cable 92 is tightened and fastened to the rear power bow by means of set screw 98. The tensioning straps are tightened by the ratchet means to stretch the tarp 62 to a tight condition, and the guide cables 92 and 93 are similarly tightened. The front power block covers 170 and the rear take-up covers 172 are then fastened in place.

When the hand crank 82 is cranked in one direction, the power bow 56 is displaced longitudinally forwardly of the container, thereby displacing all of the remaining bows forwardly in a stacked condition, with the tarp 62 being collapsed in an accordion-like manner. Upon rotation of the hand crank 82 in the opposite direction, the power bow 56 is displaced rearwardly toward the rear bulkhead 54, thereby to completely cover the open-topped container. If desired, seal means may be provided between the rear wall of the power bow 56 and the forward surface of the rear bulkhead 54.

Figure 20:
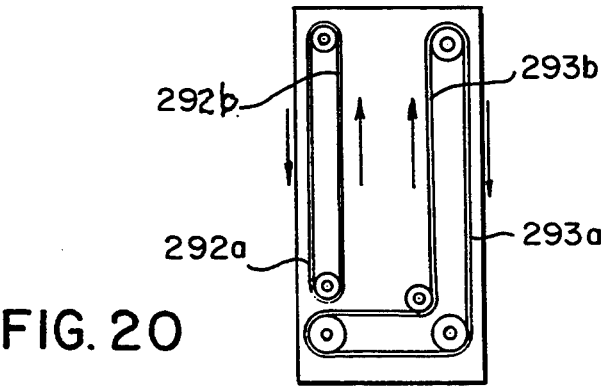
FIG. 20 is a diagrammatic-representation of a modification of the drive cable arrangement.

Various modifications may be made in the apparatus described. For example, as shown in FIG. 20, the endless drive cables may have different configurations, the main criteria being that the longitudinal runs are on opposite sides of the center support bars, with the outermost runs 292a and 293a extending simultaneously in the same direction.

Furthermore, it is possible to use worm gear means for driving the endless cables 92 and 94 from the drive shaft 74 rather than by using the travel reversing pulley arrangements 76, 110, 112, and 114. In this case, the drive pulleys have vertical axes, rather than the horizontal axis of FIG. 10.

Figure 21:
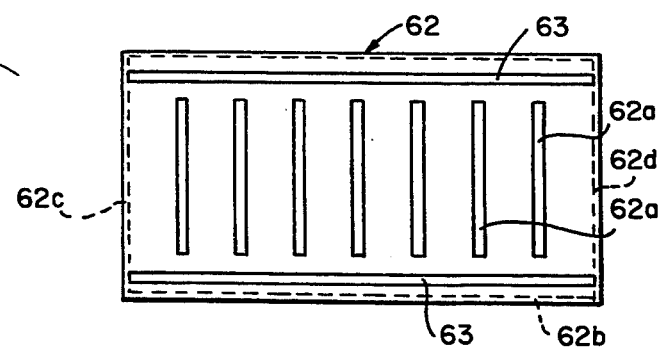
FIG. 21 is a bottom plan view of the tarp cover.
Figure 12:
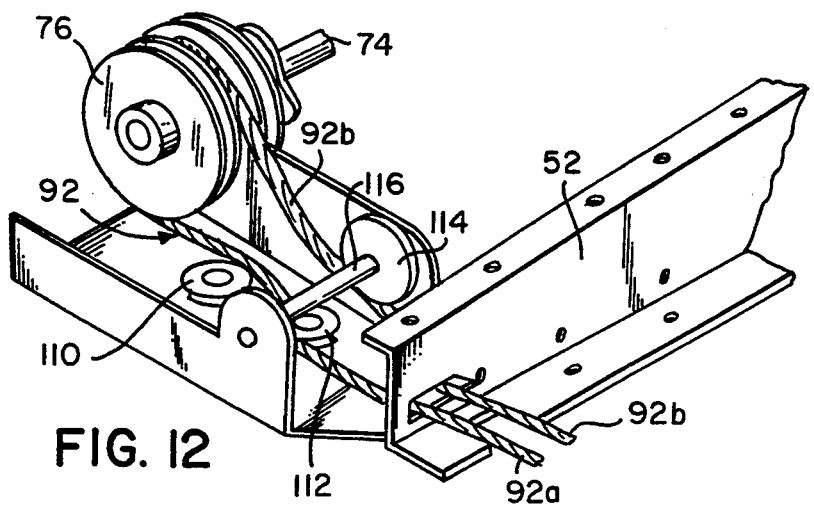
FIGS. 12 and 13 are perspective and top detailed views of the drive pulley and intermediate pulley arrangement at one end of the front bulkhead.

Referring to FIG. 21, the cover 62 may be provided with runners 63 formed for a suitable flexible stiffening material and which extend longitudinally above, spaced from and parallel with the pockets 62b, thereby to produce an upward blousing or pleating of the tarp when the bows are displaced forwardly to the open position, and also to serve as an extra wear-resistant surface for preventing the wear and friction caused by the movement of the bows over the rail cover as it slides fowardly and rearwardly over the container. One example of the material for this runner is the Seaman Corp. Style No. 8028, with Tedlar. Furthermore, hog rings or the like could be substituted for the hold-down pockets 62b.

Other modifications may be made in the apparatus described without deviating from the inventive concepts set forth above.

What is claimed is:

1. A tarp cover system for an open-topped vehicle-mounted container having a pair of parallel spaced longitudinal side walls, and transverse front and rear end walls, comprising:
  (a) a pair of elongated horizontal parallel support means (40, 44; 42, 46) for mounting in longitudinally extending relation on the upper edges of said side walls, respectively;
  (b) a plurality of generally horizontal parallel transversely-arranged bow means (50, 56, 58) supported at opposite ends by said support means, respectively, for parallel sliding movement longitudinally of the container;
  (c) a horizontal rectangular flexible tarp cover member (62) carried by said bow means for covering said container, said cover member having opposed pairs of end and side edges;
  (d) first cover connecting means (64) for connecting a first end of said cover member with a first end of the container, that one of said bow means which is adjacent the other end of the container (56) constituting a power bow means;
  (e) second cover connecting means (70) connecting the other end of said cover with said power bow means;
  (f) drive means (74) for driving said bow means between a container-covered condition in which said bow means are relatively spaced longitudinally of the container and said cover is extended to completely cover said container, and a container-uncovered condition in which said bow means are adjacent each other at said first end of said container, whereby said cover is collapsed to uncover the upper end of the container, said drive means including:
    (1) drive cable means (92,93) having a pair of first horizontal longitudinal runs (92a, 93a; 292a, 293a) each extending parallel with said support means adjacent one of the longitudinal sides thereof, respectively;
    (2) reversible means for initially driving said first cable runs simultaneously in one longitudinal direction relative to the associated support means, and for subsequently driving said first cable runs simultaneously in the opposite direction; and
    (3) cable connecting means 50g, 56g, 58g, 98, 99) connecting the ends of said bow means with the associated first cable runs, respectively;
  (g) the width of said cover member being greater than the length of said bow members, the side edge portions of said cover member extending laterally outwardly above and downwardly beyond said support means and said drive cable means, thereby to protect said support means and said drive means, said cover side edges terminating at their lower ends adjacent external surfaces of the container side walls; and
  (h) hold-down means for maintaining said cover side edge portions at a lower elevation than said support means and said drive cable means, said hold down means including a pair of generally horizontal longitudinally extending hold down cables (94,95) connected between an extension of the ends of said power bow means and the associated container side walls, respectfully.

2. Apparatus as defined in claim 1, and further including third cover connecting means connecting longitudinally spaced intermediate portions of said cover with the adjacent bow means, respectively.

3. Apparatus as defined in claim 2, wherein said third cover connecting means comprise a plurality of transversely extending bow pockets carried by said cover, said bow means extending through said bow pockets, respectively.

4. Apparatus as defined in claim 3, wherein each of said bow means is sectional and includes a center section, a pair of end sections, and means removably connecting said end sections with the ends of said center section, respectively, said center section being contained in the associated bow pocket and extending outwardly at each end therefrom.

5. Apparatus as defined in claim 2, wherein said cable connecting means includes:
   (a) means (98,99) rigidly connecting the ends of said power bow means with the associated first cable runs, respectively; and
   (b) means (50g, 50g'; 58g, 58g') slidably connecting the ends of said remaining bow means with the associated first cable runs, respectively.

6. Apparatus as defined in claim 1, wherein said hold down means comprises at least one horizontal hold-down pocket (62b) formed in the cover side edge portion, said hold-down cable extending through said hold-down pocket.

7. Apparatus as defined in claim 1, wherein said cover member includes flexible stiffening runners (63) extending longitudinally of said cover member in spaced relation to said hold-down cables, said stiffening runners being operable to cause pleating of said cover member during forward movement of said bow members toward the container-uncovered condition.

8. Apparatus as defined in claim 1, and further including at least one intermediate bow means (58) having end extensions connected with the associated hold down cable, respectively.

9. A tarp cover system for an open-topped vehicle-mounted container having a pair of parallel spaced longitudinal side walls, and transverse front and rear end walls, comprising:
   (a) a pair of elongated horizontal parallel support means (40, 44; 42, 46) for mounting in longitudinally extending relation on the upper edges of said side walls, respectively;
   (b) a plurality of generally horizontal parallel transversely-arranged bow means (50, 56, 58) supported at opposite ends by said support means, respectively, for parallel sliding movement longitudinally of the container;
   (c) a horizontal rectangular flexible tarp cover member (62) carried by said bow means for covering said container, said cover member having opposed pairs of end and side edges;
   (d) first cover connecting means (64) for connecting a first end of said cover member with a first end of the container, that one of said bow means which is adjacent the other end of the container (56) constituting a power bow means;
   (e) second cover connecting means (70) connecting the other end of said cover with said power bow means;
   (f) drive means (74) for driving said bow means between a container-covered condition in which said bow means are relatively spaced longitudinally of the container and said cover is extended to completely cover said container, and a container-uncovered condition in which said bow means are adjacent each other at said first end of said container, whereby said cover is collapsed to uncover the upper end of the container, said drive means including:
      (1) drive cable means (92,93) having a pair of first horizontal longitudinal runs (92a, 93a; 292a, 293a) each extending parallel with said support means adjacent one of the longitudinal sides thereof, respectively, and second horizontal runs (92b, 93b; 292b, 293b) each extending parallel with said first runs adjacent an opposite side of said support means, respectively, each first run and the associated second run being contained in a common horizontal plane;
      (2) reversible means for initially driving said first cable runs simultaneously in one longitudinal direction relative to the associated support means, and for subsequently driving said first cable runs simultaneously in the opposite direction; and
      (3) cable connecting means (50g, 56g, 58g, 98, 99) connecting the ends of said bow means with the associated first cable runs, respectively; and
   (g) third cover connecting means (62a) connecting longitudinally spaced intermediate portions of said cover with the adjacent bow means, respectively.

10. Apparatus as defined in claim 9, wherein each of said support means include protective side flange portions (44c 44d) that extend laterally outwardly from opposite longitudinal sides of said support means above the associated first and second drive cable runs, respectively.

11. Apparatus as defined in claim 10, wherein each of said support means is sectional and includes upper (44) and lower (40) longitudinally extending sections, and means (45) connecting together said sections, said upper section including a body portion 44a carrying said protective side flange portions (44c, 44d).

12. Apparatus as defined in claim 11, wherein said lower section comprises a support bar 40 having a width that is no greater than said upper section body portion, and further wherein said upper support section includes a pair of laterally-spaced longitudinally-extending downwardly-depending stop ribs (44b) defining therebetween a space for receiving the upper portion of said support bar, thereby to prevent lateral displacement of said upper support section relative to said support bar.

13. Apparatus as defined in claim 12, wherein the upper support section has an upper slide surface; and further wherein each of said bow means includes at each end one of its lower surface a slide pad (51) seated on the associated slide surface, said slide pad being formed of a synthetic plastic material having a low coefficient of friction.

14. Apparatus as defined in claim 10, wherein said first cover connecting means comprises a first transverse bulkhead (52) adapted for rigid mounting on the upper edge of a first end wall of the container, and means (64) connecting said first cover end edge with said first bulkhead.

15. Apparatus as defined in claim 14, wherein said drive means includes a horizontal transverse drive shaft rotatably mounted on said first bulkhead, and a pair of drive pulleys mounted on said drive shaft for driving said cable means, respectively, said drive pulleys having a common horizontal axis.

16. Apparatus as defined in claim 15, wherein said cable means includes a pair of endless cables and said drive means includes for each endless cable at least one intermediate pulley adjacent said drive pulleys, respectively, and an idler pulley adjacent the other end wall of the container, said intermediate and idler pulleys having vertical axes of rotation.

17. Apparatus as defined in claim 16, wherein said intermediate pulleys are rotatably supported by said first bulkhead, and further including a second transverse bulkhead adapted for connection with the other end wall of the container, said idler pulleys being rotatably supported by said second bulkhead.

18. Apparatus as defined in claim 15, and further including hand crank means for driving said crank shaft.

19. Apparatus as defined in claim 17, and further including removable cover means for protecting said drive and intermediate pulleys.

* * * * *